Aug. 14, 1934.　　　C. F. WARNER　　　1,970,208
SHOCK ABSORBER FOR MOTOR CARS AND OTHER VEHICLES
Filed June 28, 1932
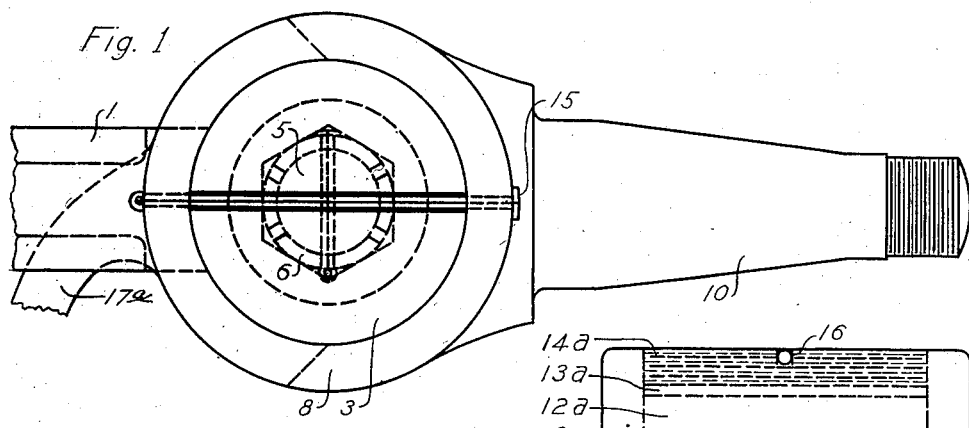
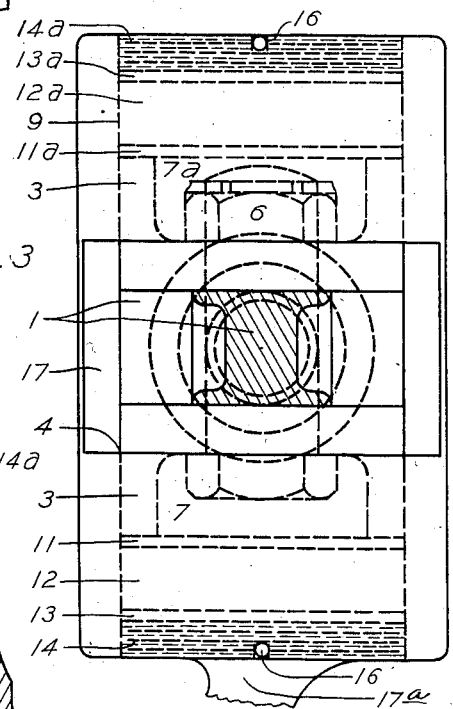
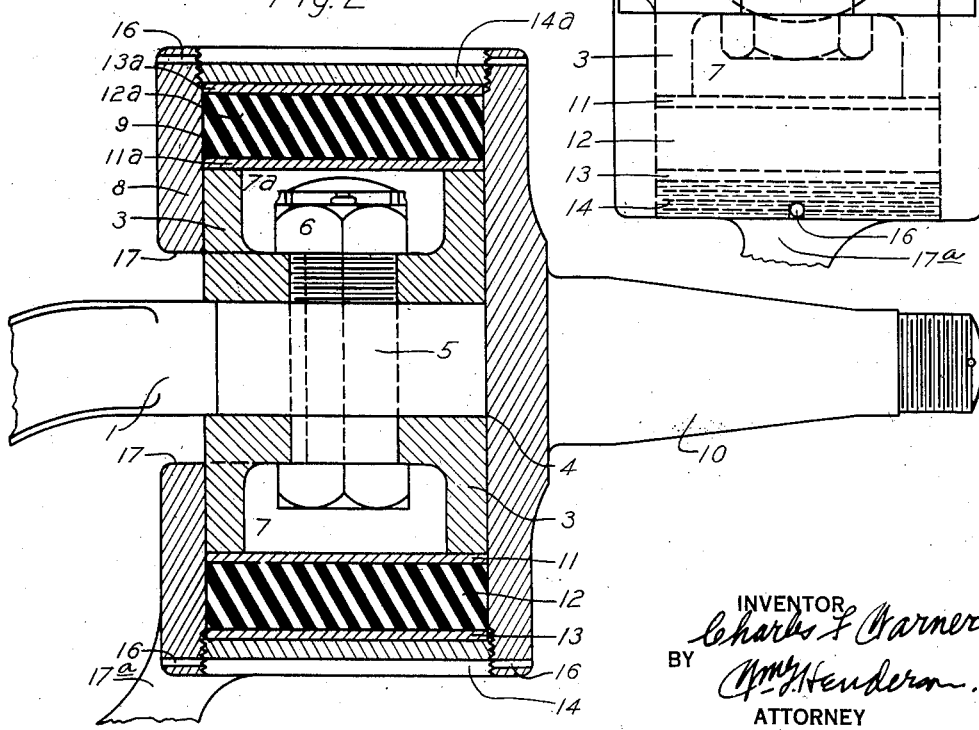
INVENTOR
Charles F. Warner
BY
ATTORNEY Patented Aug. 14, 1934

1,970,208

UNITED STATES PATENT OFFICE 1,970,208

SHOCK ABSORBER FOR MOTOR CARS AND OTHER VEHICLES

Charles Frederick Warner, Lancaster, Pa., assignor of one-half to Bertha H. Warner, Lancaster, Pa.

Application June 28, 1932, Serial No. 619,799

5 Claims. (Cl. 280—96.2)

This invention relates to shock absorbers for motor cars, or other vehicles, of any selected type. It has among its objects to provide a construction in which shocks due to irregularities in road surfaces will be substantially absorbed at the wheel spindles and thus minimized in their transmission to the body of the vehicle and at the same time permitting freedom of movement in steering the vehicle. It has for a further object to provide a construction in which a comparatively small number of parts or elements are necessary for its practical embodiment, and in which stability and endurance in use will exist, and in which also ready adjustment of the parts may be made to meet anticipated conditions, and to compensate for wear in the elements constituting the shock absorber.

To the accomplishment of the foregoing and such other objects as may hereinafter appear the invention consists in the features hereinafter described and then sought to be clearly defined by the claims, reference being had to the accompanying drawing illustrating the preferred embodiment of the invention, and in which, Figure 1 is a plan view of one end of a vehicle axle showing the invention applied;

Figure 2 is a side elevation of Figure 1, with the shock absorber in vertical section;

Figure 3 is an end elevation, looking from the left of Figure 2.

In the drawing the numeral 1 designates one end of a vehicle axle, say, the front axle of a motor car of any approved type. On the axle, adjacent to its wheel spindle is mounted a cylindrical or tubular member 3, made in one or two parts, having a central bore 4 to receive the axle 1, the bore preferably conforming to the cross sectional form of the axle, and the tubular member being held to the axle by a bolt 5 passed through the member 3 and the axle 1, and held by a nut 6 applied to a threaded end of the bolt, or otherwise held so as to lock the member 3 and axle rigidly together. The member 3 may be formed with recesses 7, 7$^a$ to receive the head and the nut 6, respectively, of bolt 5. The member 3 is enclosed wholly or partially, by a hub member 8 having a cylindrical bore 9 extending substantially at right angles or perpendicular to the axis of that portion of axle 1 which fits in the bore of the member 3, so that the member 8 may move axially of its bore, and relatively to the member 3 and the hub member may be rotated, on a vertical axis, around the member 3, the meeting faces of the two members permitting such rotation. From one side of the hub member 8 there extends a spindle 10 designed to receive a wheel of the vehicle. This spindle and the hub member from which it extends may be made integral with each other, or otherwise so that the two will move together. Bearing plates 11 and 11$^a$ are seated against the opposite ends of the member 3, and elastic cushions, preferably rubber, 12 and 12$^a$ are seated on the plates 11 and 11$^a$, and against the outer faces of said cushions are placed plates 13 and 13$^a$ which are held in place by plates 14 and 14$^a$ which may have a threaded engagement with the inner wall of the cylindrical hub 8, at opposite ends of the hub 8, as illustrated. By adjustment of the threaded plates 14 and 14$^a$, the parts or elements contained within the hub 8 may be adjusted to compensate for wear, and also keep the elements in their best operative positions. To prevent accidental unscrewing of the adjusting plates 14 and 14$^a$, cotter pins 15 may extend across the exposed faces of said plates and have their ends fit in openings 16 formed in opposite walls of hub 8, as illustrated. One side or wall of the cylindrical hub 8 will be formed with a recess or cut-out portion 17 of desired extent to permit rotation of the hub 8 around the member 3 in turning the front wheels in steering the vehicle. The rubber cushions 12 and 12$^a$ may be of substantially the same thickness, or of different thicknesses as desired, and as most of the weight is carried by the lower rubber cushion, that one may be thicker than the upper cushion, and the spindle carrying hub being vertically movable in relation to the member 3 bolted to the axle the difference in the thickness of the two cushions is taken care of. The shock absorber is illustrated applied to one end of a front axle but it will be understood that it will be duplicated at the other end, and that each cylindrical hub will have an arm 17$^a$ attached to it at a selected point so that one arm may be connected to a similar arm on the hub at the other end of the axle so that the steering mechanism of any suitable type can be manipulated for steering the vehicle.

From the foregoing it will be observed that shocks received by the wheels in passing over depressions or irregularities in the roadway traveled, or from obstructions on the roadway will be dissipated or absorbed by the shock absorber formed as described and practically prevented from being communicated to the body of the car or vehicle. Also that the device is made up of comparatively few parts or elements, simple in construction and assembly, and possessing endurance in use, and admitting of ready replacement when necessary. The elements will be made in proper proportions to suit the conditions under which the device is to be used. It is also to be understood, that changes may be made in the details without departing from the essential features as the same are sought to be defined in the appended claims.

Having described the invention and set forth its merits, what I claim is:

1. A shock absorber comprising a wheel axle, a tubular member through which the axle passes and has the tubular member secured thereto, a cylindrical hub carrying a wheel spindle and formed with a bore extending substantially perpendicular to the axis of the wheel axle and in which the member secured to the wheel-axle is contained, said hub being rotatable about a vertical axis and also axially movable relatively to the member attached to the wheel axle within the bore of the hub, plates positioned within the bore of the hub and bearing against ends of the wheel-attached member, elastic cushions bearing against the inner faces of said plates, other plates bearing against the outer faces of said elastic cushions, and adjusting plates fitting in the bore of the hub and serving for adjustment of the elements lying between them and the wheel-axle attached member.

2. A shock absorber comprising a wheel axle, a member formed with a bore to receive the axle and secured to the axle, a cylindrical hub provided with a wheel spindle and formed with a bore extending substantially perpendicular to the axis of the wheel axle, said hub being mounted for both rotary and axial movement relatively to the member secured to the wheel axle, cushioning means contained within the bore of the hub and comprising bearing plates and intermediate elastic cushions, an adjusting closure plate at the outer ends of the bore in the hub, and a pin extended across the face of said adjusting plates and having its ends seated in the cylindrical hub.

3. A shock absorber comprising a bearing secured to an axle, a hub provided with a spindle and mounted on said bearing for rotative and axial movement thereon, closure members for the ends of said hub, elastic cushioning members confined between the ends of said bearing and the closure members of said hub and bearing plates positioned between the ends of said bearing and said elastic cushioning members.

4. A shock absorber comprising a bearing secured to an axle, a hub provided with a spindle and mounted on said bearing for rotative and axial movement thereon, closure members for the ends of said hub, bearing plates positioned within said hub adjacent said closure members, other bearing plates positioned within said hub adjacent the ends of said bearing, and cushioning means confined between said bearing plates at opposite ends of said bearing.

5. A shock absorber comprising a bearing secured to an axle, a hub formed with a spindle and provided with end closure members, said hub being mounted on the bearing for axial and rotative movement thereon, and elastic compression and expansion members confined wholly within the hub between the ends of the bearing and the end closure members of the hub serving to restore the bearing to its normal position with relation to the hub when displaced.

CHARLES FREDERICK WARNER.